Oct. 6, 1964  J. R. WILSON ETAL  3,151,894
EXPANSIBLE CONNECTION CAPABLE OF EXPANDING AND
CONTRACTING RADIALLY AND AXIALLY
Filed Feb. 8, 1962
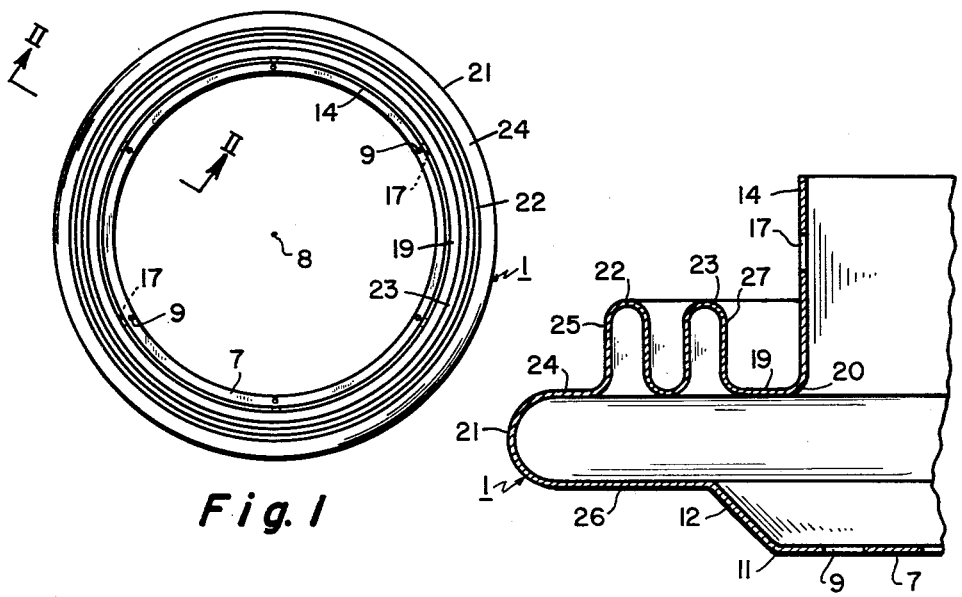
Fig. 1
Fig. 2
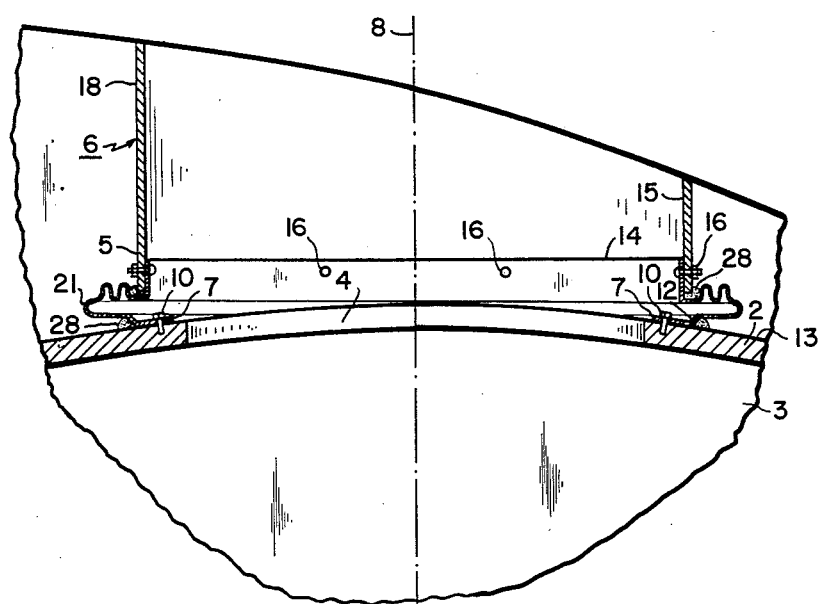
Fig. 3
INVENTORS.
John R. Wilson
Emerson D. Gerhardt
BY Webb, Mackay + Burden
THEIR ATTORNEYS

United States Patent Office 3,151,894
Patented Oct. 6, 1964

3,151,894
EXPANSIBLE CONNECTION CAPABLE OF EXPANDING AND CONTRACTING RADIALLY AND AXIALLY
John R. Wilson, Penn Township, Allegheny County, and Emerson D. Gerhardt, Murrysville, Pa., assignors to Hanlon & Wilson Company, Pittsburgh, Pa., a corporation of Pennsylvania
Filed Feb. 8, 1962, Ser. No. 171,960
4 Claims. (Cl. 285—158)

This invention relates to an expansible connection between that portion of a wall which defines an opening therein and which is a part of a vessel, container, chamber, shell, or the like, and an end of a conduit, pipe, tube, or the like, which extends outwardly from the opening and whose end is spaced apart from the opening. Particularly, this connection has ability to expand and contract in two different directions or planes such as a first plane extending substantially radially of the central axis of the opening, the conduit, or the connection itself and the second plane extending axially of the central axis of at least one of the conduits, the opening, and the connection itself, or extending substantially transversely of the first plane. Accordingly, our connection has ability to expand and contract in two different planes located perpendicularly to one another.

In conveyance of gases at elevated temperatures and high pressures from an opening in a wall of a vessel through a conduit to a place of delivery, there have been problems in providing a fluid-tight connection between the vessel and the conduit, particularly when hot blasts or jets of gas suddenly erupt from the vessel and exit its opening and flow into and through the conduit. The problems have been especially acute when the blasts comprise gas or gases at temperatures of 4000° F. and higher and pressures of 500 pounds per square inch and greater. While some of these blasts occur for a short duration such as a half second, nevertheless, a severe strain is placed upon the connections heretofore employed and rupture thereof has frequently resulted.

We have invented an expansible connection between that portion of the wall which defines an opening therein and an end of a conduit member which extends outwardly from the opening and whose end is spaced apart therefrom. Our connection has ability to expand and contract in two different directions or planes including two disposed at right angles to one another. Thus, it can withstand the severe strains encountered during an eruption of the hot gas blasts without rupture or loss of gastightness. Specifically, our connection comprises a collar which has at one end a first skirt disposed to be affixed to the wall in a position completely surrounding the opening. At the other end of the collar is a second skirt disposed to be affixxed to the end of the conduit. The collar includes walls which form at least one convolution disposed in a plane positioned substantially radially to its central axis and further includes walls which form at least one convolution disposed in a plane extending substantially transversely of the first-mentioned convolution.

In the accompanying drawings we have shown a preferred embodiment of our invention in which:

FIGURE 1 is a plan view of our connection;
FIGURE 2 is a section view along the line II—II of FIGURE 1; and
FIGURE 3 is a section view showing our invention mounted between an end of a conduit and that portion of a wall of a vessel which defines an opening therein.

Referring to FIGURES 1-3 inclusive, our connection comprises a collar 1 which is made from metal sheet such as carbon, alloy and stainless steels, aluminum and other suitable metals and generally is fabricated from at least two sections of the metal sheet welded together to form the walls of the collar. This collar is cylindrical in shape and effects a substantially fluid-tight, expansible juncture between that portion of a wall 2 of a vessel 3 which defines an opening 4 running therethrough and an end 5 of a conduit 6. This conduit 6 has a diameter greater than the diameter of the opening 4. The end 5 is spaced apart from the opening 4 in the wall 2 and the conduit 6 extends outwardly from the opening and is suitable for conveyance of hot blasts of gas at elevated temperatures such as 4000° F. and at high pressures in the order of 500 pounds per square inch to a place of delivery (not shown.)

The collar has at one end a first skirt or flange 7 which extends completely therearound and lies in a plane disposed radially of an axis 8 which is the central axis of the opening 4, the collar 1, and the conduit 6. Holes 9 extend through the skirt and provide with bolts 10 an attachment of the skirt to the wall 2 in a position where it completely surrounds the opening 4. The inner end 11 of the skirt 7 is joined to the collar by a diagonally extending leg 12. Since the skirt is made from sheet metal and is joined to the collar by the leg 12, it is flexible and thereby readily adaptable to an arcuate exterior contour 13 of the wall 2.

At the other end of the collar is a second skirt or flange 14 which is circular and extends completely around the axis 8 thereof and has a diameter greater than the diameter of the opening 4. This second skirt is in a plane which runs transversely and at right angles to the first skirt 7 and it has an attachment to the inside wall 15 of the conduit 6 and engages same completely therearound. Bolts 16 project through bores 17 in the second skirt 14 to effect attachment thereof to the conduit 6. Of course, this second skirt may alternately be affixed to the outside wall 18 of the conduit 6 instead of the inside one. A second leg 19 joined to the inner end 20 of the second skirt 14 affixes it to the collar. This second leg 19 is disposed at right angles to the second skirt.

Intermediate the first and second skirts, the walls of the collar form a first convolution 21 which extends completely around the collar and is in a plane positioned radially and perpendicularly to the axis 8. The walls of the collar additionally form second and third convolutions 22 and 23 respectively arranged in tandem to one another and with each located transversely and at right angles to the first convolution 21 and parallel to the axis 8. Wall section 24 of the first convolution 21 intersects wall section 25 of the second convolution 22 at an angle of about 90°. Side 26 of the first convolution 21 is attached to the first leg 12 and side 27 of the third convolution 23 is joined to the second leg 19. FIGURES 2 and 3 show that the convolutions 22 and 23 are spaced inwardly of the convolution 21.

The first, second and third convolutions form a bellows arrangement which has ability to expand and contract in two different planes or directions which are at right angles to one another. Specifically, the first convolution 21 permits expansion and contraction axially of the axis 8 and the second and/or third convolutions 22 and 23 have ability to expand and contract radially of the axis 8. Accordingly, when there is an ejection or eruption of a blast of hot gas at 4000° F. and at 500 pounds per square inch out through the opening 4 and into the conduit 6, the collar 1 has ability to expand radially and axially to compensate for its own expansion and subsequent contraction after passing of the blast as well as the expansion and contraction of the conduit 6 and/or the wall 2. Since the collar can expand and contract both axially and radially, there is little likelihood of a rupture in the walls of the collar, thereby assuring a gastight connection between the wall and the conduit.

As shown in FIGURE 3, the three convolutions are open to the gases which exit the opening and flow into the conduit and do not require a baffle for protection therefrom.

Although the connection, as shown, has two convolutions positioned transversely of the first one 21, a single convolution positioned transversely of the first one 21 satisfactorily permits expansion and contraction axially and/or radially of the axis 8 when required.

To assure that the connection is gastight, a sealant 28 such as epoxy resin or other suitable substance is applied between the first leg 12 and the wall 2 and between the second leg 19, side 27 of the third convolution 23 and the conduit 6.

While we have shown and described certain preferred embodiments of our invention, it is understood that it may be otherwise embodied within the scope of the following claims.

We claim:

1. An expansible connection between that portion of a wall which defines an opening therein and an end of a conduit member which extends outwardly from said opening, which is adapted to convey fluid under pressure and whose end is spaced apart from said opening and from said portion of said wall, said conduit member having a diameter greater than the diameter of said opening, said connection comprising a collar having at one end a first skirt affixed to said wall in a position completely surrounding said opening and having at its other end a second skirt affixed to said end of said conduit member completely therearound, said second skirt having a diameter greater than the diameter of said opening, one of said skirts being disposed in a plane which extends transversely of the plane of the other skirt, said collar including walls which form at least one convolution disposed in a plane positioned substantially radially to its central axis and further including walls which form at least one convolution disposed in a plane extending substantially transversely of said first mentioned convolution, said collar being made of a material capable of withstanding high temperatures and high pressures and being capable of expanding and contracting radially and axially.

2. The connection of claim 1 characterized by said convolutions being in fluid flow communication with said opening and said conduit member.

3. The connection of claim 1 characterized by said first mentioned convolution being spaced inwardly of said second mentioned convolution.

4. The connection of claim 1 characterized by said convolutions being in fluid flow communication with said opening and said conduit member and by said first mentioned convolution being spaced inwardly of said second mentioned convolution.

References Cited in the file of this patent

UNITED STATES PATENTS

| 1,989,957 | Walters | Feb. 5, 1935 |
| 2,456,636 | Jones | Dec. 21, 1948 |
| 2,807,478 | Hermann | Sept. 24, 1957 |
| 2,843,995 | Furstenberg | July 22, 1958 |
| 2,871,885 | Ray | Feb. 3, 1959 |
| 3,017,898 | Hobson | Jan. 23, 1962 |
| 3,036,148 | Swerdlow | May 22, 1962 |

FOREIGN PATENTS

| 658,066 | France | Jan. 22, 1929 |